United States Patent [19]

Horacek et al.

[11] 4,452,921

[45] Jun. 5, 1984

[54] PROCESS FOR THE PREPARATION OF POLYURETHANE-POLYISOCYANURATE FOAMS

[75] Inventors: Heinrich Horacek, Frankenthal; Robert Gehm, Limburgerhof; Wolfram Frank, Heidelberg; Matthias Marx, Bad Durkheim, all of Fed. Rep. of Germany

[73] Assignee: BASF Aktiengesellschaft, Ludwigshafen, Fed. Rep. of Germany

[21] Appl. No.: 450,436

[22] Filed: Dec. 16, 1982

[30] Foreign Application Priority Data

Dec. 23, 1981 [DE] Fed. Rep. of Germany ....... 3151041

[51] Int. Cl.³ .................................................. C08G 18/18
[52] U.S. Cl. ................................... 521/118; 521/164; 521/902; 502/167
[58] Field of Search ....................... 521/118, 164, 902; 252/434

[56] References Cited

U.S. PATENT DOCUMENTS 4,026,840  5/1977  Bechara et al. ............. 521/118 OR
4,040,992  8/1977  Bechara et al. ............. 521/117 OR
4,067,830  1/1978  Kresta ......................... 521/902 X
4,070,345  1/1978  Winkelmann et al. ....... 521/164 X

*Primary Examiner*—John Kight, III
*Assistant Examiner*—Garnette D. Draper
*Attorney, Agent, or Firm*—Joseph D. Michaels

[57] ABSTRACT

The invention describes a process for harmonizing the reaction rates for the formation of urethane and isocyanurate groups during the preparation of polyurethane-polyisocyanurate foams by reacting organic polyisocyanates with polyols in the presence of blowing agents and salts of amines having the formula

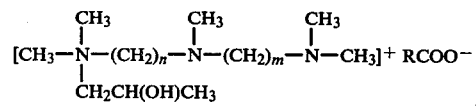

as catalysts, wherein R stands for an hydrogen atom or a straight chained or branched alkyl radical with 1 to 19 carbon atoms, and n and m are equal or different whole numbers from 2 to 10.

5 Claims, 2 Drawing Figures

PROCESS FOR THE PREPARATION OF POLYURETHANE-POLYISOCYANURATE FOAMS

BACKGROUND OF THE INVENTION

1. Field of the Invention

This invention relates to the field of rigid cellular urethane-modified polyisocyanurate compositions and specifically to a catalyst for their preparation.

2. Description of the Prior Art

The preparation of polyisocyanurate foams containing urethane groups is described in numerous publications and patents. Examples thereof are the publications in Journal of Cellular Plastics, January 1965, pages 85-90; Journal of Cellular Plastics, July 1968, pages 248-260; Kunststoffe (Plastics) 62 (1972), pages 731-732 as well as British Application No. 1,155,768.

For the preparation of urethane group-containing polyisocyanurate foams, organic polyisocyanates may be cyclized and/or polymerized in the presence of auxiliaries and catalysts and the resultant isocyanate group-containing polyisocyanurate and/or polymers may subsequently be reacted with polyols. Advantageously, however, the trimerization and/or polymerization of the polyisocyanate and the polyaddition of the polyols to the polyisocyanate or isocyanate group-containing polyisocyanurates are carried out simultaneously.

Suitable catalysts for cyclizing and polymerizing the polyisocyanates include, for example, strong bases such as quaternary ammonium hydroxides, for example benzyltrimethylammonium hydroxide; alkali metal hydroxides such as sodium or potassium hydroxide; alkali metal alkoxides such as sodium methylate and potassium isopropylate; trialkylphosphines such as triethylphosphine; dialkylamino alkylphenols such as 2,4,6 tris(dimethylaminomethyl)phenol; 3- and/or 4-substituted pyridines such as 3- or 4-methylpyridine; metal organic salts such as sodium tetrakis(hydroxyethyl)borate; Friedel-Crafts catalysts such as aluminum chloride, ferric chloride, boron trifluoride, zinc chloride and alkali metal salts of weak organic acids and nitrophenols and imides such as potassium octanoate, potassium 2-ethylhexanoate, potassium benzoate, sodium picrate, and potassium phthalimide. Also used are the strongly basic N,N',N"-tris(dialkylaminoalkyl)-s-hexahydrotriazines such as N,N',N"-tris(dimethylaminopropyl)-s-hexahydrotriazine, optionally combined with aliphatic, low molecular mono and/or dicarboxylic acids such as acetic acid and/or adipic acids, or aromatic carboxylic acids such as benzoic acid.

In addition to the referenced cyclization and polymerization catalysts, catalysts are normally used which accelerate the addition reaction between the polyisocyanates and the polyols. Suitable so-called polyurethane catalysts include, for example, tertiary amines such as dimethylbenzylamine, bis(dimethylaminoethyl)ether, bis-(dimethylaminopropyl)urea, N-methyl and/or N-ethylmorpholine, dimethylpiperazine, 1,2-dimethylimidazole, 1-aza-bicyclo[3,3,0]octane and preferably triethylenediamine, metal salts such as tin dioctanoate, lead octanoate, tin di-2-ethylhexanoate and preferably stannous salts and dibutyltin dilaurate as well as particularly mixtures of tertiary amines and organic tin salts.

In German Application No. 26 31 733 (U.S. Pat. No. 4,040,992) quaternary hydroxyalkylammonium compounds are described as highly effective catalysts for addition and/or polymerization reactions of organic isocyanates for the preparation of urethane and/or isocyanurate group-containing products such as polyurethanes and polyisocyanurates.

Such quaternary hydroxyalkylammonium compounds, however, as do mixtures of polyisocyanurate and polyurethane catalysts have the disadvantage that they undergo the so-called intermittent PIR reaction. Under the designation "intermittent PIR reaction," a description of foaming behavior has been introduced into the literature (for example, G. F. Baumann and W. Dietrich, Journal of Cellular Plastics, May/June (1981), 144 and J. Bechara, Journal of Cellular Plastics, March/April (1979) 102) wherein, corresponding with FIG. 1, the curve of the foaming rate A of foam formulations with an isocyanate to hydroxyl group ratio greater than 2 shows 2 maximum of the foaming rate during the foam formation, or wherein curve B of the specific volume [cubic centimeters/gram] shows 2 points of inflection as a function of time [minutes]. In the curve of the foaming rate A, the first maximum of the foaming rate is correlated with the urethane formation and the second maximum foaming rate is correlated with the isocyanurate formation. The drawback of this mode of operation is that the polyurethane reaction is accelerated first and that the polyisocyanurate reaction is accelerated on a subsequent basis only so that inhomogeneous foam pieces are obtained.

SUMMARY OF THE INVENTION

The subject of this invention is a method for harmonizing the reaction rates for the formation of urethane and isocyanurate groups during the preparation of polyurethane-polyisocyanurate foams by reacting organic polyisocyanates with polyols in the presence of blowing agents and optionally cross-linking agents, auxiliaries and additives in the presence of an effective amount of a catalyst selected from the group consisting of amines having the formula

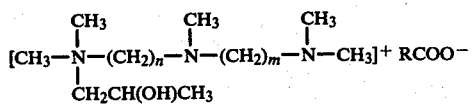

wherein
R is a hydrogen atom or a straight-chained or branched alkyl radical with 1 to 19 carbon atoms, and
n and m are whole numbers from 2 to 10 which may be equal or different.

In the presence of the amine salts to be used in accordance with this invention, the polyurethane and polyisocyanurate formations are catalyzed simultaneously. The curve of the foaming rate A (FIG. 2) therefore only shows 1 maximum rate, and curve B which describes the dependence of the specific volume upon time, shows one point of inflection. Another advantage is that the reaction rates compared to catalysts described in German Application No. 26 31 733 are reduced and that the processing properties of the polyurethane-polyisocyanurate foam systems are thereby improved.

DESCRIPTION OF THE PREFERRED EMBODIMENTS

Figure 1:
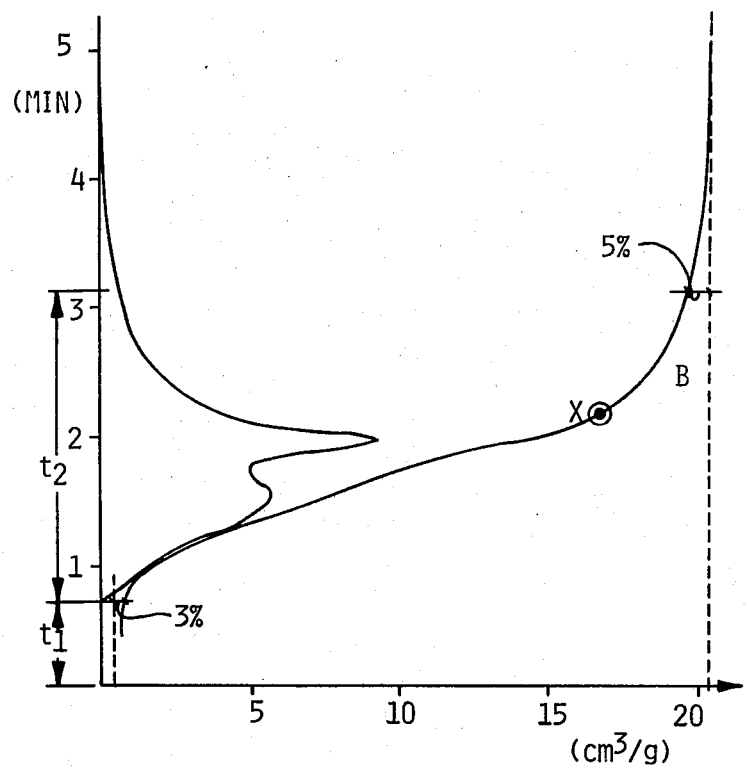
FIG. 1 shows a plot of rate of foaming (A) and specific volume (B) versus time for a polyurethane-polyisocyanurate system catalyzed by catalyst of the prior art.

The ammonium diamine salts to be used in accordance with this invention are prepared by reacting one mole of permethylated dialkylenetriamine with one mole of propylene oxide and one mole of a carboxylic acid having 1 to 20 carbon atoms, preferably without solvent or in the presence of a solvent such as low molecular weight branched polyols having hydroxyl numbers of 100 to 800, preferably 250 to 500, and or glycols, particularly dipropylene glycol, at reaction temperatures of 15° C. to 90° C., preferably of 25° C. to 60° C. and under pressures of 1 to 7 bar, preferably 2 to 3.5 bar.

As a function of the reactant structures, the reaction parameters, and the optional solvent, the reaction times are 1 to 15 hours, preferably 2 to 6 hours.

Suitable permethylated dialkylenetriamines have the formula $(CH_3)_2N-(CH_2)_n-N(CH_3)-(CH_2)_m-N(CH_3)_2$ in which n and m are equal or different and represent a whole number from 2 to 10, preferably 2 to 6. Specific examples include the following: pentamethyldiethylenetriamine, pentamethylditrimethylenetriamine, pentamethylditetramethylenetriamine, pentamethyldipentamethylenetriamine, pentamethyldihexamethylenetriamine, pentamethyldioctamethylenetriamine, pentamethyldidecamethylenetriamine, pentamethylethylenetrimethylenetriamine, pentamethylethylenetetramethylenetriamine pentamethylethylenehexamethylenetriamine, and pentamethyltetramethylenehexamethylenetriamine, with the readily available symmetrical pentamethyl-dialkylenetriamines being preferred.

2-Hydroxypropylpentamethylammoniumdiethylenediamine, 2-hydroxypropyl-pentamethylammoniumdipropylenediamine, and/or 2-hydroxypropyl-pentamethylammoniumdihexamethylenediamine have proven to work particularly well and are therefore preferably used as ammoniumdiamines.

In addition to formic acid, suitable carboxylic acids include those with straight chained or branched alkyl radicals having 1 to 9 carbon atoms, preferably 6 to 8 carbon atoms. Examples include acetic acid, propionic acid, 2,2-dimethylpropionic acid, butyric acid, n- and iso-hexanoic acid, n- and iso-heptanoic acid, n- and iso-octanoic acid, n- and iso-decanoic acid, n- and iso-hexadecanoic acid, 2-ethylhexanoic acid, and 2-ethyloctanoic acid. Preferably used are formic acid, acetic acid, and particularly 2-ethylhexanoic acid.

For the preparation of polyurethane-polyisocyanurate foams, the ammonium diamine salts according to this invention are used as catalysts in amounts of 0.01 to 5.0 percent by weight, preferably 0.2 to 2 percent by weight based on the overall weight of polyols and polyisocyanates.

The polyurethane-polyisocyanurate foams may be prepared according to known methods from commonly used components such as polyols, organic polyisocyanates, blowing agents and optionally crosslinking agents, auxiliaries, and additives.

Suitable polyols include, for example, polyester polyols and preferably polyether polyols. However, other hydroxyl group-containing polymers with molecular weights of 200 to 6000 may also be used. Examples of these substances include polyacetals such as polyoxymethylenes and poly(butanediol formal), polyester amides and polycarbonates, particularly those prepared by transesterification of diphenylcarbonate with 1,6-hexanediol.

Suitable polyester polyols may be prepared for example from dicarboxylic acids, preferably aliphatic dicarboxylic acids with 2 to 12, preferably 4 to 8 carbon atoms, and multifunctional alcohols. Examples include aliphatic dicarboxylic acids such as glutaric acid, pimelic acid, subaric acid, azelaic acid, sebacic acid, undecanedioic acid, and preferably succinic and adipic acids, aromatic dicarboxylic acids such as phthalic acid, and terephthalic acid; and cycloaliphatic acids such as tetrahydrophthalic acid. Examples for di- and multifunctional alcohols are ethylene glycol, diethylene glycol, propylene glycol, trimethylene glycol, dipropylene glycol, 1,4-butanediol, 1,6-hexanediol, 1,10-decanediol, neopentyl glycol, trimethylolpropane and glycerine. Preferably used are ethylene glycol, propylene glycol and glycerine.

The polyester polyols which have molecular weights from 200 to 4000, preferably from 300 to 1500, and hydroxyl numbers of 40 to 880, preferably of 150 to 600, may be used individually or as mixtures.

The polyether polyols are prepared according to known methods from one or more cyclic ethers having 2 to 4 carbon atoms and an initiator molecule which contains from 2 to 8 active hydrogen atoms. Suitable cyclic ethers include tetrahydrofuran, oxetane, 1,2- or 2,3-butylene oxide, and preferably ethylene oxide and propylene oxide. The cyclic ethers may be used individually, alternatingly in sequence, or as mixtures. Suitable initiator molecules include: water, dicarboxylic acids such as succinic, adipic, phthalic and terephthalic acid, optionally mono and dialkylsubstituted diamines with 1 to 4 carbon atoms in the alkyl radical, such as ethylenediamine, 1,2- and/or 1,3-propanediamine, 1,4-butanediamine, 1,6-hexanediamine, 4,4'-, 2,4'- and 2,2'-diaminodiphenylmethane, triamines such as diethylenetriamine, optionally alkylsubstituted dialkanolamines with 1 to 4 carbon atoms in the alkyl radical such as diethanolamine, diisopropanolamine, N-methyl- and N-ethyldiethanolamine; trialkanolamines such as triethanolamine and triisopropanolamine, and preferably multifunctional alcohols such as ethylene glycol, 1,2-propylene glycol and trimethylene glycol, diethylene glycol, dipropylene glycol, 1,4-butanediol, 1,6-hexamethylene glycol, glycerine, trimethylolpropane, trimethylolethane, pentaerythritol, sorbitol and sucrose. Preferably used are ethylene glycol, propylene glycols, glycerine, sorbitol and sucrose. The polyether polyols which have molecular weights from 200 to 1500, preferably from 300 to 500, and hydroxyl numbers of 100 to 800, preferably of 250 to 500, may also be used individually or as mixtures.

Optionally it may be advantageous to use crosslinking agents for the preparation of the polyurethane polyisocyanurate foams in addition to the polyols. Possible crosslinking agents include polyfunctional, particularly di to tetrafunctional compounds, with molecular weights from 18 to less than 600, preferably of 60 to 400. Suitable examples include di- and/or trifunctional alcohols such as ethylene glycol, propylene glycol, 1,4-butanediol, 1,6-hexamethylene glycol, glycerine, di($\beta$-hydroxyethyl)-hydroquinone; diamines such as ethylene diamine, 3,3'-di or 3,3',5,5'-tetra-alkylsubstituted- 4,4'-diaminodiphenylmethanes with 1 to 4 carbon atoms in the alkyl radical, 3,3'-dichloro-4,4'-diaminodiphenylmethane; and alkanolamines such as diethanolamine and triethanolamine.

Suitable for the preparation of the polyurethane-polyisocyanurate foams are organic polyisocyanates having the formula $R'(NCO)_p$ wherein R' is a multifunctional aliphatic, alkyl aromatic, or aromatic organic radical or mixed radicals of this type and wherein p is a whole number, the value of which corresponds with the valency of R' and is at least 2. Typical organic polyisocyanates include, for example, aromatic polyisocyanates such as 2,4- and 2,6-toluene diisocyanate, 2,2'-, 2,4'-, 4,4'-diphenylmethane diisocyanate, triphenylmethane triisocyanates, biphenyldiisocyanates, m- or p-phenylene diissocyanate, and 1,5-naphthalene diisocyanate and aliphatic polyisocyanates such as isophorone diisocyanate and hexamethylene diisocyanate. Preferably used are the crude and pure toluene diisocyanates and mixtures of 2,2'-, 2,4'- and 4,4'-diphenylmethane diisocyanate and polyphenylpolymethylenepolyisocyanates (crude MDI). The polyisocyanates may be used individually or as mixtures.

For the preparation of the polyurethane-polyisocyanurate foams, the polyisocyanates and polyols, as well as optionally crosslinking agents, are reacted in such quantity ratios that 1.7 to 10, preferably 2 to 5, isocyanate groups are in the reaction mixture per hydroxyl group, or other Zerewitinoff active hydrogen atoms.

Blowing agents which may be used in the process of this invention include water which reacts with isocyanate groups to form carbon dioxide. The amounts of water which may be used advantageously are 0.2 to 4 percent by weight, preferably 1 to 3 percent by weight, based on the weight of the polyols.

Other useful blowing agents which are preferably used are low boiling liquids which vaporize under the influence of the exothermal polymerization and/or polyaddition reaction.

Suitable for this purpose are liquids which are inert with respect to the organic polyisocyanate and which have boiling points of no more than 100° C. under atmospheric pressure, preferably between −40° C. and +50° C. Examples of such preferably used liquids are halogenated hydrocarbons, such as methylene chloride, trichlorofluoromethane, dichlorodifluoromethane, dichloromonofluoromethane, dichlorotetrafluoroethane and 1,1,2-trichloro-1,2,2-trifluoroethane. Mixtures of these low boiling liquids with each other and/or with other substituted or unsubstituted hydrocarbons may also be used.

The most advantageous amount of low boiling liquid for the preparation of the foams depends upon the foam density to be achieved, as well as optionally on the use of water. Generally amounts of 5 to 50 percent by weight based on the polyol provide satisfactory results.

Auxiliaries and additives may also be used. Examples include surfactants, plasticizers, flame retardants, hydrolysis protection agents, fungistats and bacteriastats, dyes, pigments and fillers.

For example, those surfactants may be used which support the homogenization of the raw materials, and which may optionally also be suited as cell regulators. Examples include siloxane-oxyalkalene block polymers and other organopolysiloxanes, oxyethylated alkylphenols, oxyethylated fatty alcohols, paraffin oils, castor oils and/or ricinoleic esters and Turkey Red oil which are used in amounts of 0.2 to 6 parts by weight per 100 parts by weight of polyol.

It may also be advantageous to include a plasticizer in the reaction mixture in order to reduce the tendency toward brittleness in the products. Commonly used plasticizers may be used but it is particularly advantageous to use those substances which contain phosphorus and/or halogen atoms and which thereby additionally increase the flame resistance of the polyurethane-polyisocyanurate foams. These substances include tricresyl phosphate, tris-2-chloroethyl phosphate, tris-chloropropyl phosphate and tris-2,3-dibromopropyl phosphate.

In addition to already mentioned halogen-substituted phosphates, inorganic flame retardants such as antimony trioxide, arsenic oxide, ammonium phosphate and calcium sulfate may be used to render the polyurethane-polyisocyanurate foams flame resistant. Generally it has proven to be advantageous to use 5 to 50 parts by weight, preferably 5 to 25 parts by weight of the mentioned flame retardants per 100 parts by weight of polyol.

More detailed data on the above-mentioned other commonly used auxiliaries and additives are contained in the literature, for example in the monograph by J. H. Saunders and K. C. Frisch, "High Polymers," Volume XVI, Polyurethanes, Parts 1 and 2, Interscience Publishers, 1962 and 1964.

The polyurethane-polyisocyanurate foams are prepared according to the prepolymer, and preferably according to the one-shot method. For this purpose, the polyols and/or polyol mixtures are intensively mixed with the polyisocyanates, catalysts, blowing agents, and optionally crosslinking agents, auxiliaries and additives, in the mentioned quantity ratios at temperatures of 10° to 60° C., preferably of 15° C. to 40° C., after which the reaction mixture is allowed to foam.

The polyurethane-polyisocyanurate foams have densities of 20 to 100 grams per liter, preferably 30 to 60 grams per liter, and excel by their mechanical and thermal properties as well as their good flame resistance. The products are preferably used as insulating materials, particularly in the construction industry.

The parts referred to in the examples are parts by weight.

Preparation of the ammonium-diamine salts to be used in accordance with this invention.

EXAMPLE 1

A mixture of 432 parts of 2-ethylhexanoic acid and 519 parts of pentamethyldiethylenetriamine was placed in a reactor which was equipped with a stirrer, a reflux condenser and a feed reservoir. At 25° C., 174 parts of propylene oxide was added. After completing the addition of the propylene oxide, the mixture was stirred at 100° C. in order to complete the reaction. Subsequently, the volatile components were distilled off under a pressure of 0.01 bar at 100° C.

1061 parts of N-2-hydroxypropyl-pentamethylammonium diethylenediamine 2-ethylhexanoate (PMDETA) was obtained as a stripped product.

EXAMPLES 2 AND 3

The method of Example 1, was repeated except that 603 parts of pentamethyldipropylenetriamine and 1378 parts of pentamethyldihexamethylenetriamine were used in separate runs instead of the pentamethyldiethylenetriamine. The stripped products were 1130 parts of N-2-hydroxypropyl-pentamethylammonium-dipropylenediamine 2-ethyl-hexanoate (PMDPTA), and 2100 parts of N-2-hydroxypropyl-pentamethylammonium-dihexamethylenediamine 2-ethyl-hexanoate (PMDHTA).

Preparation of polyurethane-polyisocyanurate foams:

EXAMPLES 4–6 AND COMPARISON EXAMPLES I–III

Component A: Mixture of 50 parts of a polyether polyol based on sucrose, glycerine, and water as initiator molecules and propylene oxide with a hydroxyl number of 390,
4.5 parts castor oil, Table I also identifies the measured Cream ($t_1$), Rise ($t_2$) and gel times (X) and the number of the foaming rate maxima.

The names of the catalysts used as comparison substances were abbreviated in the table as follows:

TMR: N-2-hydroxypropyl-trimethylammonium 2-ethylhexanoate,
TMR-2: N-2-hydroxypropyl-trimethylammoniumformate,
KF: Potassiumformate; 35 percent by weight solution in ethylene glycol,
HHT: Tris-(dimethylaminopropyl)-s-hexahydrotriazine,
TEA: Triethylamine.

TABLE I

Polyurethane-Polyisocyanurate Foams (Density: 50 Grams/Liter)

Figure 2:
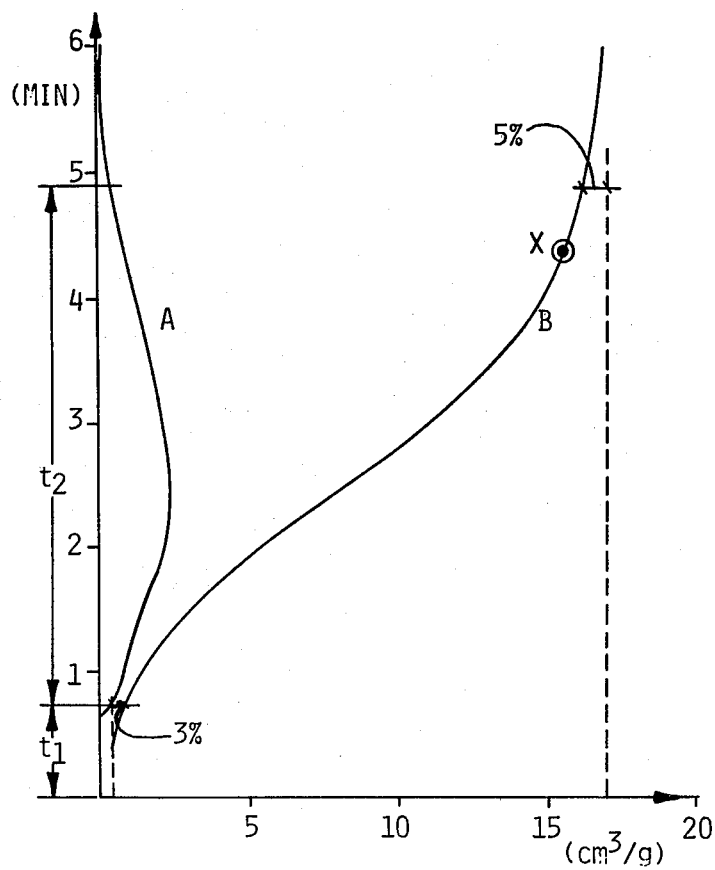
FIG. 2 shows similar data for a system catalyzed according to this invention showing the harmonization of the urethane and isocyanurate reaction rates.

| Example | Comparison Example | Catalyst | Cream Time $t_1$ [seconds] | Rise Time $t_2$ [seconds] | Gel Time (X) [seconds] | Foaming Rate maxima |
|---|---|---|---|---|---|---|
| 4 | — | PMDETA | 50 | 230 | 120 | 1 (FIG. 2) |
| 5 | — | PMDPTA | 55 | 230 | 160 | 1 |
| 6 | — | PMDHTA | 50 | 260 | 190 | 1 |
| — | I | TMR | 40 | 145 | 30 | 2 (FIG. 1) |
| — | II | KF | 50 | 212 | 120 | 2 |
| — | III | HHT:KF = 1:2 | 25 | 157 | .25 | 2 |

2.1 parts glycerine,
13.3 parts tris-($\beta$-chloroethyl)phosphate,
0.5 parts foam stabilizer based on polyetherpolysiloxane (stabilizer OS 710 by Bayer AG),
11 parts trichlorofluoromethane, and
3.3 parts catalyst.

Component B: Mixture of 90 parts of a prepolymer produced from 84 parts of a mixture of diphenylmethane diisocyanates, and polyphenylpolymethylene polyisocyanates, and 6 parts of the above-mentioned polyether polyol, with a hydroxyl number of 390, and
9 parts of trichlorofluoromethane.

34 parts of Component A and 100 parts of Component B were mixed well for 10 seconds, the foamable reaction mixture was poured into a paper cup and was allowed to foam.

Using the device, Model 121 by Fluidyne, and the method of ASTM-D 1546-62, the foam height and the foaming rate were recorded as a function of time and the gel time X was measured. The density of the resultant polyurethane-polyisocyanurate foams was 50 [grams per liter].

Used as catalysts were 0.83 percent by weight of the compounds listed in Table I, based on the overall weight of the polyisocyanate and polyol.

EXAMPLES 7–9 AND COMPARISON EXAMPLES IV AND V

Component A: Mixture of:

80 parts of a polyether polyol based on sucrose, glycerine and water as initiator molecules, and propylene oxide with a hydroxyl number of 390,
20 parts of a polyether polyol based on tetrabromophthalic acid-glycerine as initiator molecule, and propylene oxide with a hydroxyl number of 310,
2 parts of foam stabilizer based on silicone (DC 193 by Dow Corning),
55 parts trichlorofluoromethane, and
18 parts tris($\beta$-chloropropyl)-phosphate.

Component B: Mixture of diphenylmethane-diisocyanates and polyphenyl-polymethylene-polyisocyanates (crude MDI)

76 parts of Component A and 100 parts of Component B were mixed intensively for 10 seconds. The foamable reaction mixture was thereupon poured into a paper cup and was allowed to foam.

The technical data were determined in accordance with Examples 4–6.

The type and amounts (the percent by weight are based on the overall weight of polyol and polyisocyanates) of the catalysts used, as well as the resultant technical data, are summarized in Table II.

TABLE II

Polyurethane-Polyisocyanurate Foams Density: 35 (Grams/Liter)

| Examples | Comparison Examples | Catalyst Type | Amount (% by wt.) | Cream Time $t_1$ (seconds) | Rise Time $t_2$ (seconds) | Gel Time (X) [seconds] | Foaming Rate maxima |
|---|---|---|---|---|---|---|---|
| 7 | — | PMDETA | 0.5 | 50 | 222 | 60 | 1 |
| 8 | — | PMDPTA | 0.5 | 72 | 348 | 125 | 1 |
| 9 | — | PMDHTA | 0.5 | 80 | 420 | 150 | 1 |
| — | IV | TMR-2 | 0.15 | | | | |
| | | KF | 0.30 | 145 | 185 | 20 | 2 |
| | | TEA | 0.06 | | | | |

TABLE II-continued

| | | Polyurethane-Polyisocyanurate Foams Density: 35 (Grams/Liter) | | | | | |
|---|---|---|---|---|---|---|---|
| | | Catalyst | | | | | |
| Examples | Comparison Examples | Type | Amount (% by wt.) | Cream Time $t_1$ (seconds) | Rise Time $t_2$ (seconds) | Gel Time (X) [seconds] | Foaming Rate maxima |
| — | V | TMR | 0.5 | 50 | 190 | 147 | 2 |

The embodiments of the invention in which an exclusive privilege or property is claimed are defined as follows:

1. A process for the preparation of polyurethane-polyisocyanurate foams by reacting polyisocyanates with polyols in the presence of blowing agents and optionally cross-linking agents, auxiliaries and additives in the presence of an effective amount of a catalyst selected from the group consisting of amines having the formula

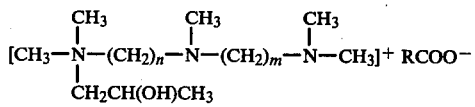

wherein

R is hydrogen atom or a straight chained or branched alkyl radical with 1 to 19 carbon atoms, and n and m are whole numbers from 2 to 10 which are equal or different.

2. The process of claim 1 wherein the salts of the amines are used in quantities of 0.01 to 5 percent by weight based on the total weight of the organic polyisocyanates and polyols.

3. The process of claim 1 wherein 2-hydroxypropyl-pentamethylammoniumdiethylenediamine, 2-hydroxypropyl-pentamethylammoniumdipropylenediamine, or 2-hydroxypropyl-pentamethylammoniumdihexamethylenediamine are used as amines.

4. The process of claim 1 wherein the anion of 2-ethylhexanoic acid is used as RCOO$^-$.

5. The process of claim 1 wherein the ratio of isocyanate to hydroxyl groups is 2 to 5.

* * * * *